United States Patent
Carroll et al.

(10) Patent No.: US 6,446,217 B1
(45) Date of Patent: Sep. 3, 2002

(54) SYSTEM FOR DETERMINING AND CONTROLLING THE PEAK AMPLITUDE AND PHASE OF AN OSCILLATING MEMBER

(75) Inventors: Raymond Carroll, Boxford; Joseph G. Walsh, Cambridge, both of MA (US)

(73) Assignee: Milli Sensor Systems & Actuators, Inc., West Newton, MA (US)

(*) Notice: Subject to any disclaimer, the term of this patent is extended or adjusted under 35 U.S.C. 154(b) by 0 days.

(21) Appl. No.: 09/266,679

(22) Filed: Mar. 11, 1999

Related U.S. Application Data

(60) Provisional application No. 60/077,516, filed on Mar. 11, 1998.

(51) Int. Cl.[7] .................................................. G06F 1/04
(52) U.S. Cl. ....................................... 713/500; 713/503
(58) Field of Search ................................. 713/500, 502, 713/503; 700/35, 56, 69, 71, 188, 275, 280

(56) References Cited

U.S. PATENT DOCUMENTS

| | | | | |
|---|---|---|---|---|
| 4,637,723 A | * | 1/1987 | Egli et al. | 356/350 |
| 4,790,657 A | * | 12/1988 | Kozma | 356/350 |
| 4,830,486 A | * | 5/1989 | Goodwin | 356/4.09 |
| 5,326,163 A | * | 7/1994 | Langton | 356/350 |
| 5,347,359 A | * | 9/1994 | Hutchings et al. | 356/350 |
| 5,581,142 A | * | 12/1996 | Terajima | 310/316 |

* cited by examiner

Primary Examiner—Dennis M. Butler
(74) Attorney, Agent, or Firm—Mirick, O'Connell, DeMallie & Lougee, LLP

(57) ABSTRACT

This invention describes a technique for measuring the peak amplitude and phase of an oscillating member without using any external precision references other than stable precision frequencies. The technique relies upon stable reference dimension of the oscillating member and stable dimensions of a stationary system which the member is oscillating with respect to. The technique uses a stable precision crystal clock oscillator to measure the time at which the oscillating member arrives at certain reference angles. The reference angles may be established on the member or by interferometry, with respect to sensors on a stationary member.

Using inputs from the sensors, a precision clock, and counters the system determines the period of oscillation of the vibrating member and the phase of the maximum excursions of the vibrating member based on the time required for the oscillating member to move through the reference angles established on the reference member.

28 Claims, 8 Drawing Sheets

SYSTEM FOR DETERMINING AND CONTROLLING THE PEAK AMPLITUDE AND PHASE OF AN OSCILLATING MEMBER

CROSS REFERENCE TO RELATED APPLICATION

This application is a continuation in part of Provisional application Ser. No. 60/077,516 filed Mar. 11, 1998.

FIELD OF THE INVENTION

This invention relates to a system for determining and controlling the peak amplitude and phase of an oscillating member.

BACKGROUND OF INVENTION

This invention solves a long standing problem wherein the angular momentum in precision accelerometers and gyroscopes using a vibrating (sinusoidally oscillating) mass as the inertial reference must be measured to the extremely high precision of one part per million. The accuracy of inertial sensing based on the dynamics of a vibrating mechanical mass is governed by the stability of the angular momentum, which is a product of the mechanical inertia, the vibration frequency, and the vibration amplitude and phase. The mechanical inertia may be controlled by temperature regulation. The vibration frequency may be adequately controlled by reference to a stable clock. In the prior art, the vibration amplitude and phase are generally controlled by reference to a stable voltage or current. However, voltage references, other than superconducting references, are not able to stabilize oscillation amplitudes and phases below a few parts per million.

A prior method of measuring the phase relationship of two waveforms is described in U.S. Pat. No. 5,867,693, in which the phase relationship is derived from a direct count of the clock pulses of the first waveform occurring during a target cycle of the second waveform. This prior art method does not take into account the out-and-back symmetry of a sinusoidal oscillation with respect to the beats of an interrogating interferometer, which is an integral part of the preferred embodiment of this invention. Therefore this invention is expected to sense the true phase of an oscillating member with much greater accuracy.

SUMMARY OF THE INVENTION

This invention solves that problem by offering a means to stabilize a sinusoidally oscillating amplitude to less than a part per million of the peak, and the phase to less than a tenth part per million of the oscillation cycle.

Therefore it is an object of this invention to stabilize the amplitude and phase of a sinusoidal mechanical oscillation to less than a part per million of the peak and the phase to less than a tenth part per million of the oscillation cycle.

It is also an object of this invention to measure the peak amplitude and phase of an oscillating member with respect to a stable clock reference and either a stable laser wave length reference or with respect to fiducial markings on the oscillating member itself.

It is also an object of this invention to measure the phase of an oscillating member by summing the times that occur as the oscillator passes through a fixed reference angle on either side of an oscillation peak and dividing the sum by two, taking advantage of the out-and-back symmetry of the sinusoidal oscillations of an oscillation resonance.

It is also an object of this invention to measure the amplitude of a sinusoidally oscillating member by recording the times that occur as the oscillator passes through a fixed set of reference angles. These times may be used to estimate the maximum slope of the oscillation angle versus time, from which the oscillation amplitude may be estimated.

In the preferred embodiment of this invention, the oscillating member is a part of a Michelson Interferometer modified to generate interference beats from an angular oscillation. The optical interference is incident on a photodetector, which generates a current proportional to the intensity of the interfering beams. The beat current is fed through a comparator circuit to create a square wave with leading and trailing edges. The leading and trailing edges are fed into a latch, which stores a clock count immediately following the edge. Each of these times is then fed sequentially into a computer, which computes the amplitude and phase of the oscillation peak.

An advantage of the invention is that it very precisely determines the phase of the sinusoidal waveform, from which the relative phase of two oscillators can be computed. The relative phase of two mechanical oscillations is very important in gyroscopic applications, since the product of the two oscillation amplitudes is proportional to the gyroscopic torques applied to the supporting structures. By means of this measurement, very precise estimates of gyroscopic rates is possible.

BRIEF DESCRIPTION OF THE DRAWINGS

Other objects, features and advantages will occur to those skilled in the art from the following description of the preferred embodiment, and the accompanying drawings, in which.

DETAILED DESCRIPTION OF THE INVENTION

Figure 1A:
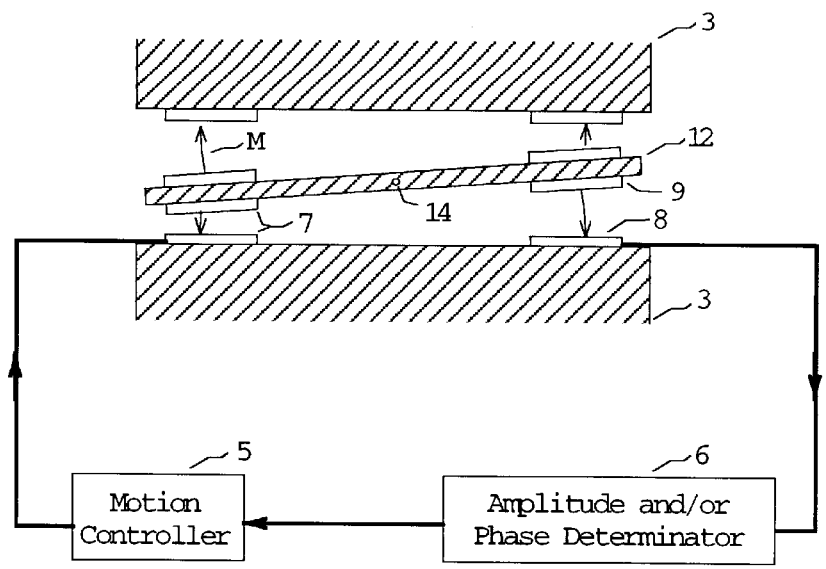
FIG. 1A is a schematic block diagram of a system for accomplishing the invention.

This invention features a system which determines, and controls, one or both of the oscillation amplitude and phase of an oscillating member which oscillates relative to a fixed structure. The general scheme is shown in FIG. 1A. Oscillating member 12 is oscillated about pivot 14, in the direction of arrow M, relative to fixed structure 3. Cooperating position sensors 8 and 9 on structure 3 and member 12, respectively, provide the information to determinator 6, which allows the system to determine the amplitude and/or phase of the oscillation. Motion controller 5, responsive to determinator 6, generates signals which cause oscillating member position/phase controller active member 7 to generate force on member 12, for example. an electrostatic force, which accomplishes a desired phase and/or maximum oscillation amplitude. Preferably, for use in a pendulous oscillating gyroscope, or pendulous oscillating gyroscopic accelerometer, the oscillation amplitude and phase is held constant using this system.

Figure 1B:
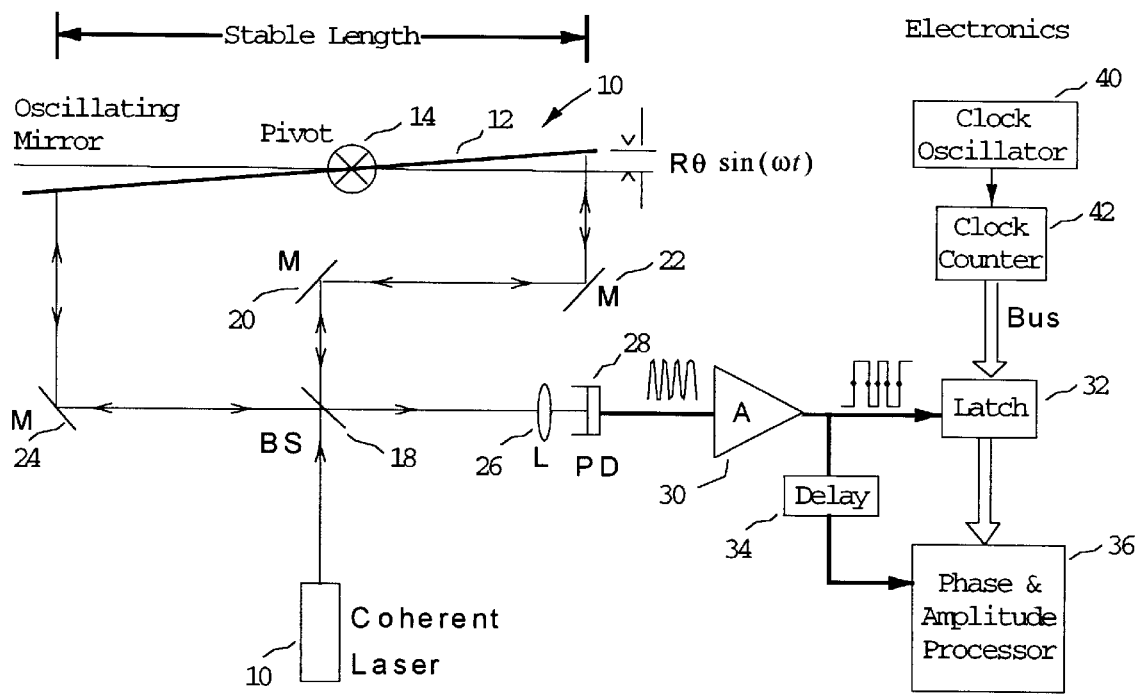
FIG. 1B is a Michelson interferometer for measuring angular oscillations feeding into timing electronics that generate a sequence of time data for processing by computer, according to this invention.

The preferred method for sensing mechanical sinusoidal oscillations is a Michelson Interferometer, shown in FIG. 1B, modified to read angular motions. The Interferometer generates a set of fringes that becomes a time versus amplitude optical grid against which the mechanical oscillator phase and amplitude can be measured. All measurements are made using time from a clock oscillator.

The interferometer 10 can be described conceptually using FIG. 1B. The light from a laser 16 is split at a beam splitter 18, and directed with mirrors 20, 22, 24, to reflect from mirrored surfaces on two ends of a mechanical oscillator 12, which oscillates about pivot 14. The reflected beams are recombined at the beam splitter 18, and the parallel interfering beams are directed through lens 26 to photodetector 28 which responds to the intensity of the interference. The interference is due to the addition of the amplitudes of two optical waves in this case. Fringes are derived as the doppler shifted waves slide past each other to form peaks when they are in phase and valleys when they are in opposing phase. The motion of the waves is caused by the motion of the mechanical oscillator as the beams need to travel farther for one side and less for the other and vice versa as the motion reverses. The figure also indicates the corresponding fringe pattern fed into an electronics comparator 30.

For stable operation, the interferometer needs to meet two conditions. First, a thermally "stable length" is selected which determines the radius of oscillation. Secondly, it is desirable that the optical path lengths that the beams travel, up to the mechanical oscillator, be matched. It is assumed throughout that the path lengths at zero angular deflection are matched. This can be done by feedback control to the mechanical oscillator and nulling, for example, either the first or the second harmonic component in the fourier-bessel spectrum of the photodetector current.

The thermally stable length sets the radius of oscillation, R which establishes the measured differential path length. A 1 ppm requirement on the angle amplitude requires the same for the measured differential path length and hence for the stable length. It is assumed that the radius of oscillation is stabilized by temperature regulation, for example.

The matching of the optical path lengths at zero mechanical deflection is not critical for the phase measurement but is required for the amplitude control. By zero mechanical deflection, is meant the mean position between two peaks of the mechanical oscillation.

The first order requirements on the laser and detector are respectively: 1. provide a single mode, coherent beam and 2. have sufficient bandwidth to respond to the frequency of the interference fringes with acceptable phase delay. White noise in the detector circuit actually plays a beneficial part in the averaging of the signals and will be discussed below. The single mode requirement placed on the laser is to make certain that only one wavelength is taking part in the interference. For example, mode competition in a multimode laser will seriously degrade the interferometer. Coherence is necessary for the waves to interfere although a very long coherence length is not needed. Line widths of perhaps 10–100 MHz are sufficient. This means that laser diodes would work fine.

The high frequency crystal controlled oscillator 40, shown in FIG. 1B, continually updates a counter 42. Every time the optical interference fringes generate a pulse, the counter data is strobed into the latch 32 and then into the computer with a half clock period delay accomplished by delay 36. The continuous counter logic strobes the counter data into the latch one half clock cycle after the counter has been incremented to assume no ambiguity or loss of data. The computer is then commanded to take the data. The time between successive pulses will be calculated by the computer to determine the phase and amplitude of the mechanical oscillation.

There are a number of other detector means, and/or indicator means such as the reflectors which can be used, and in combinations other than the one chosen for FIG. 1B. For example, the oscillator member may be scribed with a grating indicator means, and the moving diffraction pattern detected with an appropriate detector means. Also mirrors or slots may be placed on the oscillating member as the indicator means such that a light beam might be intensity modulated. Another approach is to place tiny magnetic stripes on the oscillating member as the indicator means, and detect the edges with a coil or equivalent detector means. Still another approach is to place capacitive fingers on the oscillating member as indicator means, and also on a facing stator surface as the detector means, which detect the variation in capacitance as the oscillating member moves. Another approach might be to use optical compact disk encoding and read-out technology. Many other methods can be thought of, but the interferometric approach seems to be the most precise, at least for the described application.

Figure 2:
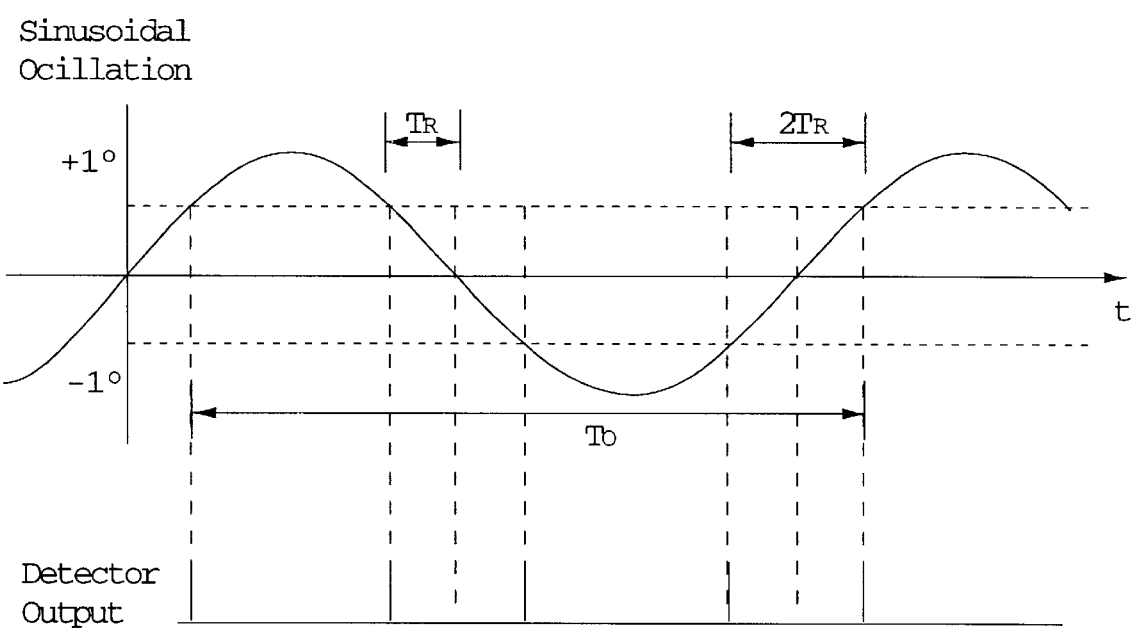
FIG. 2 illustrates how fixed angle references are translated into timing pulses by the system of FIG. 1B.

FIG. 2 further illustrates important concepts of the invention by using only two angle reference levels symmetrically placed about the center of oscillation. This invention introduces a method for precision control of the peak to peak amplitude of a sinusoidally driven disc or beam at a frequency ω by controlling the time required for the disc or beam to rotate through known reference mechanical angles $\pm\theta_R$ which is less than the zero to peak mechanical angle $\theta_{MAX}$ The angular motion of the disc would be described as $\theta=\theta_{MAX} \sin(\omega t)=\theta_{MAX} \sin(2\pi t/T_0)$, where $1/T_0$ is the frequency of oscillation. The sinusoidal oscillation as a function of time is shown in FIG. 2. The time $T_R$ required to move through an angle $\theta_R$ from $\theta=0$ is $$T_R = \frac{T_0}{2\pi} \arcsin(\theta_R / \theta_{\text{MAX}}).$$

If the ratio $T_R/T_0$ is forced to be constant, for example by servo control to be described below, then $\theta_{MAX}$ is forced to be a constant, For example if the ratio $T_R/T_0$ is forced to be $T_R/T_0=1/8$ then $\sin(2\pi/8)=1/\sqrt{2}$ and $\theta_{MAX}=\sqrt{2}\theta_R$. Thus if $\theta_R=1.000000$ degree, then $\theta_{MAX}=1.414214$ degrees.

This invention also relates to a system and method to precisely measure the phase of the sinusoidal mechanical oscillation. Observe in FIG. 2 that the sinusoidal oscillation traverses the angle $\theta_R$ at precisely the time interval $T_R$ before the peak and at precisely time interval $T_R$ after the peak. The same holds for the angle $-\theta_R$. The detector output shown in FIG. 2 provides pulses at precisely these level cross-over times. Therefore, the average of the clock times of the pulse before a peak and the pulse after a peak is a precise measure of the phase of the waveform. This is true even if the levels are not symmetric about the center of motion and is true even if the levels drift slowly with time. Therefore, this invention relates to a phase measuring technique that is impervious to these imperfections in the levels. It is solely based on the out-and-back symmetry of the angle reference levels. Out-and-back symmetry refers to the fact that the sinusoidal mechanical oscillation looks symmetric with respect to the oscillation peak even with imperfections in the interferometer or other means for establishing the angle reference levels.

Figure 3:
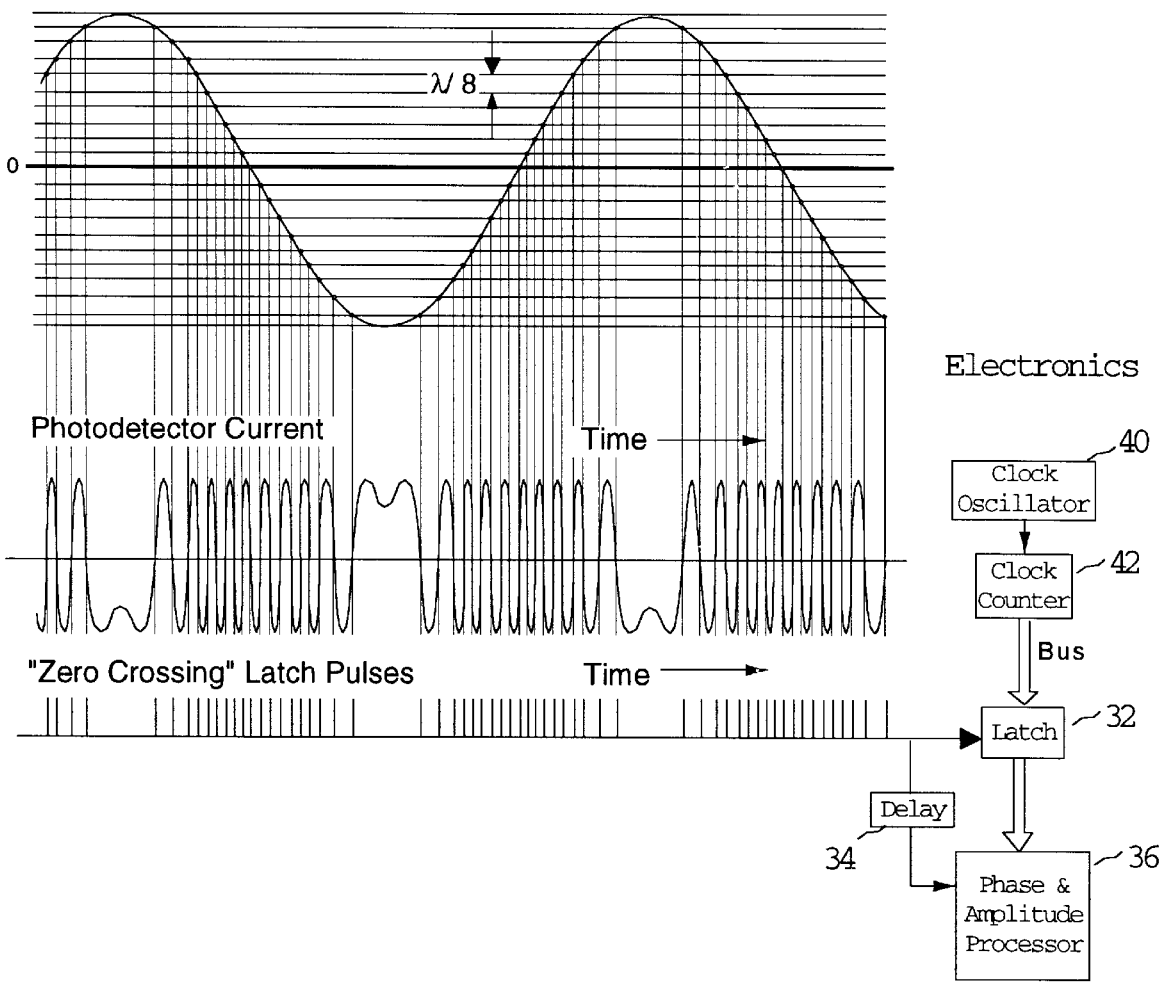
FIG. 3 illustrates a multiplicity of angle references generated by the interferometer of FIG. 1B. The series of pulses then triggers the latch at each zero crossing of the optical beat signal

In FIG. 3 can be seen the sinusoid which represents the mechanical oscillator motion. Its frequency is, for example, 1 kHz. Below the mechanical displacement is shown the corresponding set of fringes represented as the current emanating from the photodetector 28. Two characteristics of the fringes are visible. First they are not equally spaced along the time axis; that is due to the motion of the oscillator which goes at its fastest at its center of motion and slowest at the peaks. Second, the fringe corresponding to the peak of the motion is broad and fluctuates substantially compared to the average peak current.

The zero crossings may be generated by an AC-coupling of the detector output which converts the fringe pattern to one whose median is at zero volts. The zero crossings are the zero voltage crossings of the fringe pattern. In FIG. 3, vertical lines have been drawn below the zero crossings, marked as "zero crossing" latch pulses, to indicate the pulses occurring when the corresponding mechanical motion crosses an angle reference level. FIG. 3 is a generalization of FIG. 2 to many angle reference levels. Horizontal lines connect the intersections on the mechanical displacement curve that occur at the same angle reference levels. The result is an optical grid with two characteristics: 1. vertical lines that are unequally spaced in time and 2. horizontal lines that are equally spaced since they represent equal $\frac{1}{8}$-th wavelength increments. The $\frac{1}{8}$-th derives from a factor of $\frac{1}{2}$ for two moving mirrors, a factor of $\frac{1}{2}$ from the out-and-back optical path and a factor of 2 from using both the leading edge and the trailing edges of the zero crossings. This figure also represents the symmetrical alignment of the fringe pattern levels with respect to the center of mechanical motion. That is, the optical paths are matched when the paddle is at its null position, therefore the interference at the center of the mechanical motion is at a peak. This corresponds to two zero crossings equally straddling the center of motion. This is a condition which is desired for the amplitude measurement as described above. Since rotation of the paddle or optical path length instabilities will make the fringe pattern move left or right and the intersections on the mechanical motion move up and down, it is desirable to stabilize the center of motion with respect to the interferometer fringe pattern.

In an experiment, a HeNe gas laser with a wavelength of 0.6328 micron has being used. For a radius of rotation of R=1 cm, and an angular amplitude of 0.0175 rad (1 degree), the length the light travels due to the rotation is 0.0175 cm. The differential path length of one arm of the interferometer then spans 0.0175 cm/0.6328 microns =276 wavelengths. Each interference fringe which occurs every wavelength contains two zero crossings, therefore the total number of angle reference levels is 552. Taking into account that two arms make up the total relative motion of the two beams, an additional factor of two is needed which brings the total zero crossings to 1104. Further taking into account the full peak to peak movement, another factor of 2 gives a total zero crossing count of 2208 for every half cycle. This corresponds to a separation between levels on the grid pattern of one-eighth wavelength.

Figure 4A:
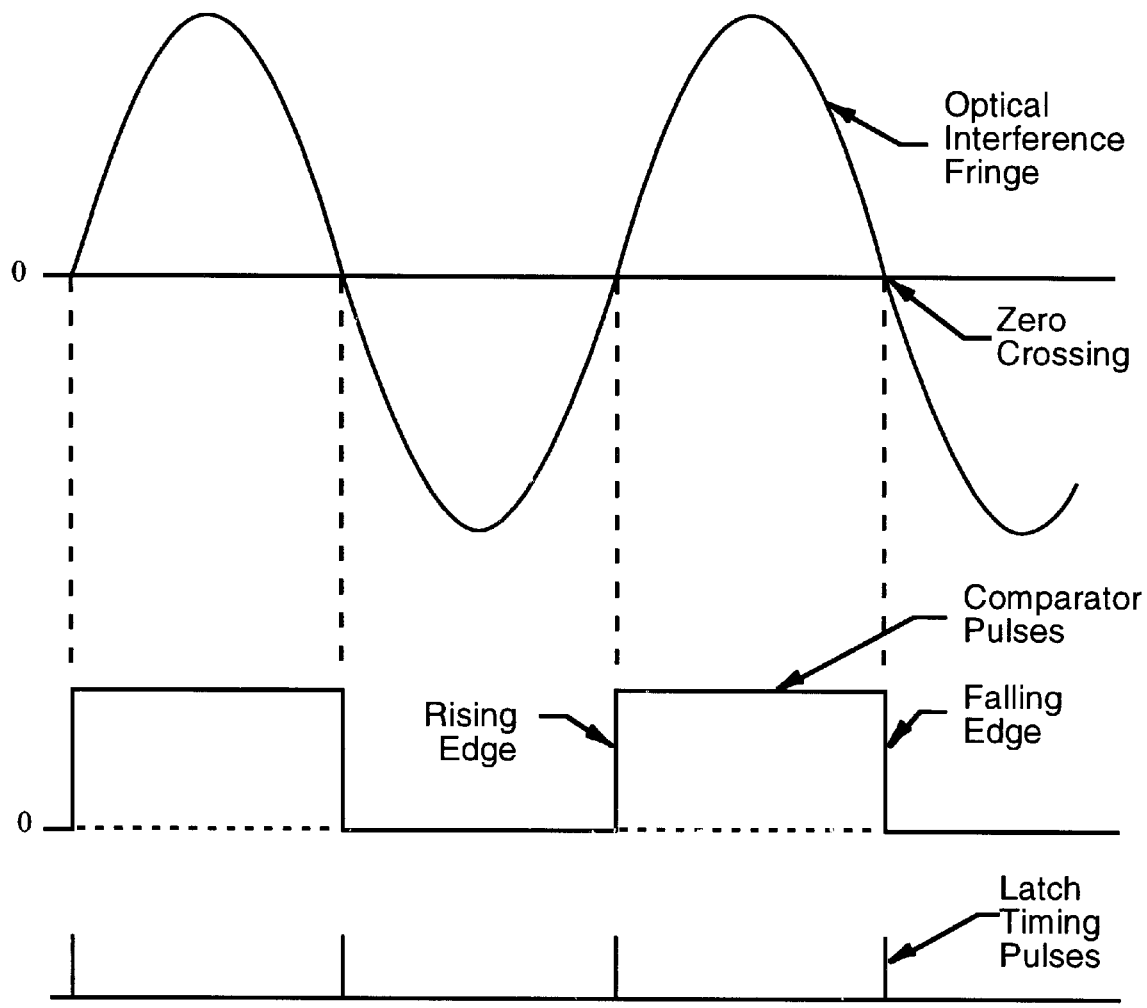
FIG. 4A illustrates the generation of the latch trigger pulses from an optical interference fringe beat signal, by the system of FIG. 1B.
Figure 4B:
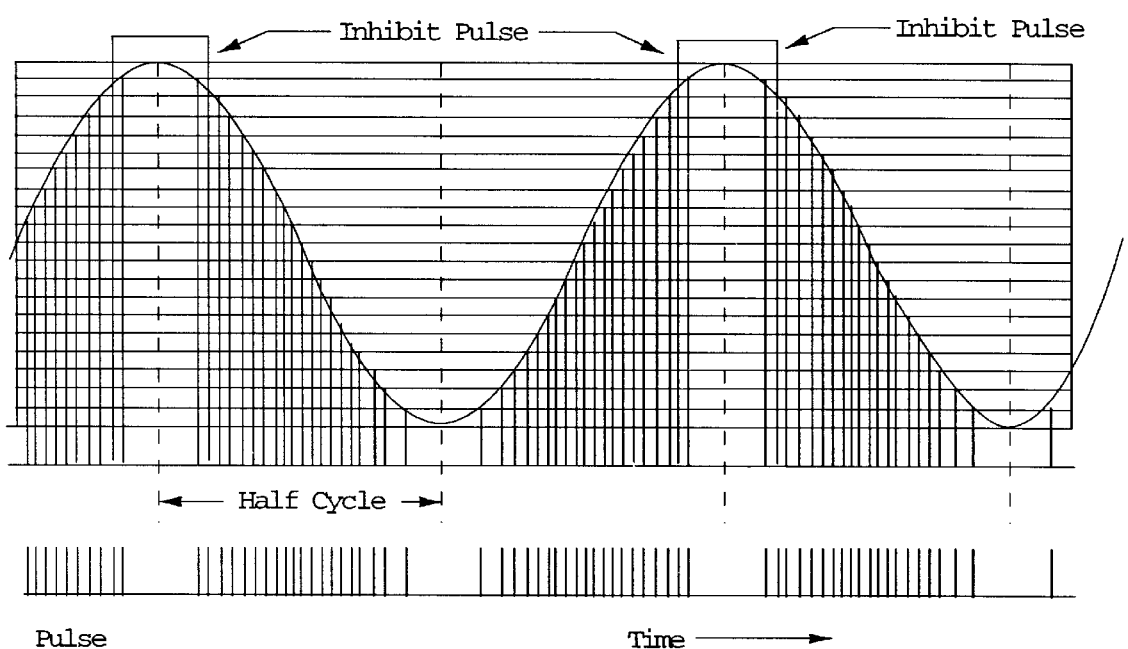
FIG. 4B illustrates the inhibit pulses with respect to the mechanical oscillation and the zero crossing.

FIG. 4A illustrates the relationship between the optical interference fringe current emanating from the photodetector, the comparator pulses generated from these and the timing pulses used to set the latch. FIG. 4B illustrates the inhibit pulses described below, with respect to the mechanical oscillations and the zero crossings.

Figure 5:
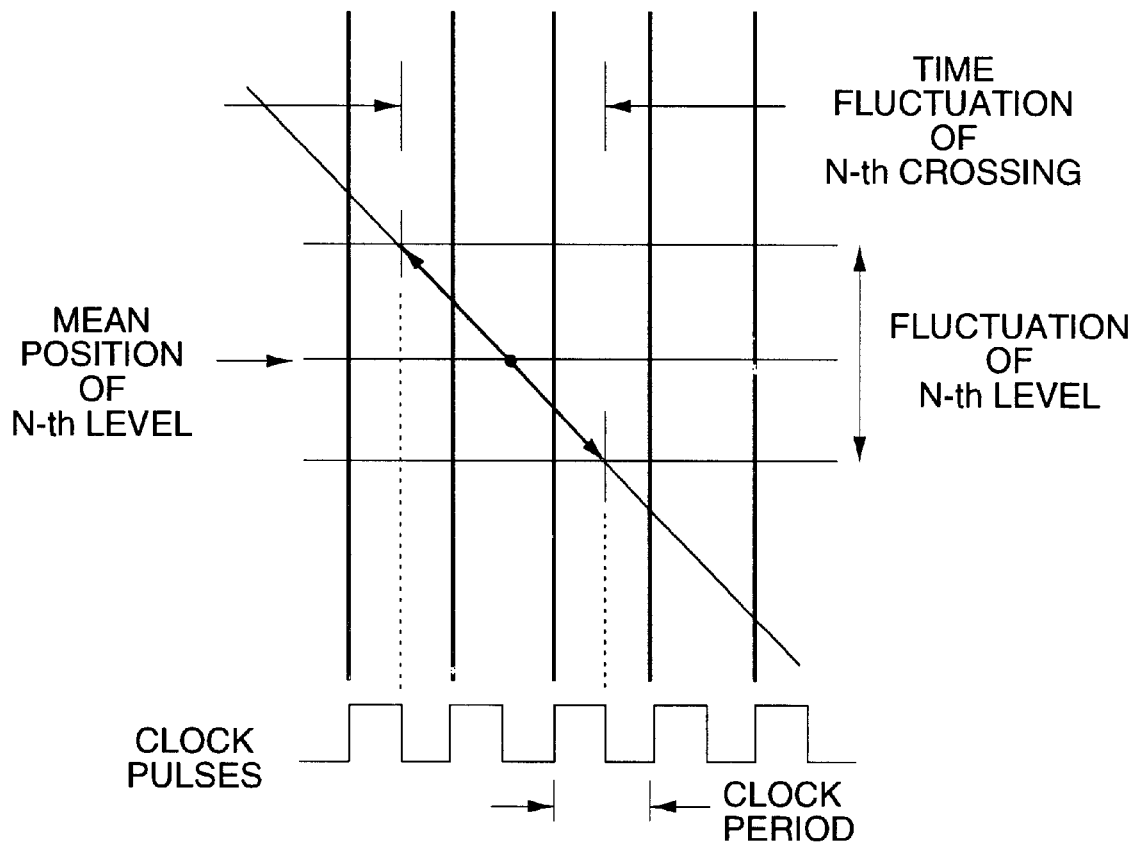
FIG. 5 illustrates the role of noise in removing aliasing from the sampling of the clock counts in the latches, for the system of FIG. 1B.

FIG. 5 illustrates the timing of the zero crossing levels and the clock pulses. The clock pulses do not occur right at the zero crossing and there is therefore an aliasing problem in this scheme. Natural noise which originates in the laser/detector and electronics is expected to improve the resolution of each zero crossing time measurement by "smearing" the zero crossing over the period of many pulses and thereby deriving a time average of a zero crossing equivalent to a fraction of a pulse width. By adding in a random component of noise that exceeds the clock period to the photodetector current to smear the time fluctuation of the N-th crossing, the aliasing becomes random and can be averaged statistically. In the above experiment the full number of zero crossings in each half cycle is 2208. By averaging these, the resolution of the peak center is improved by the square root of the number.

Figure 6:
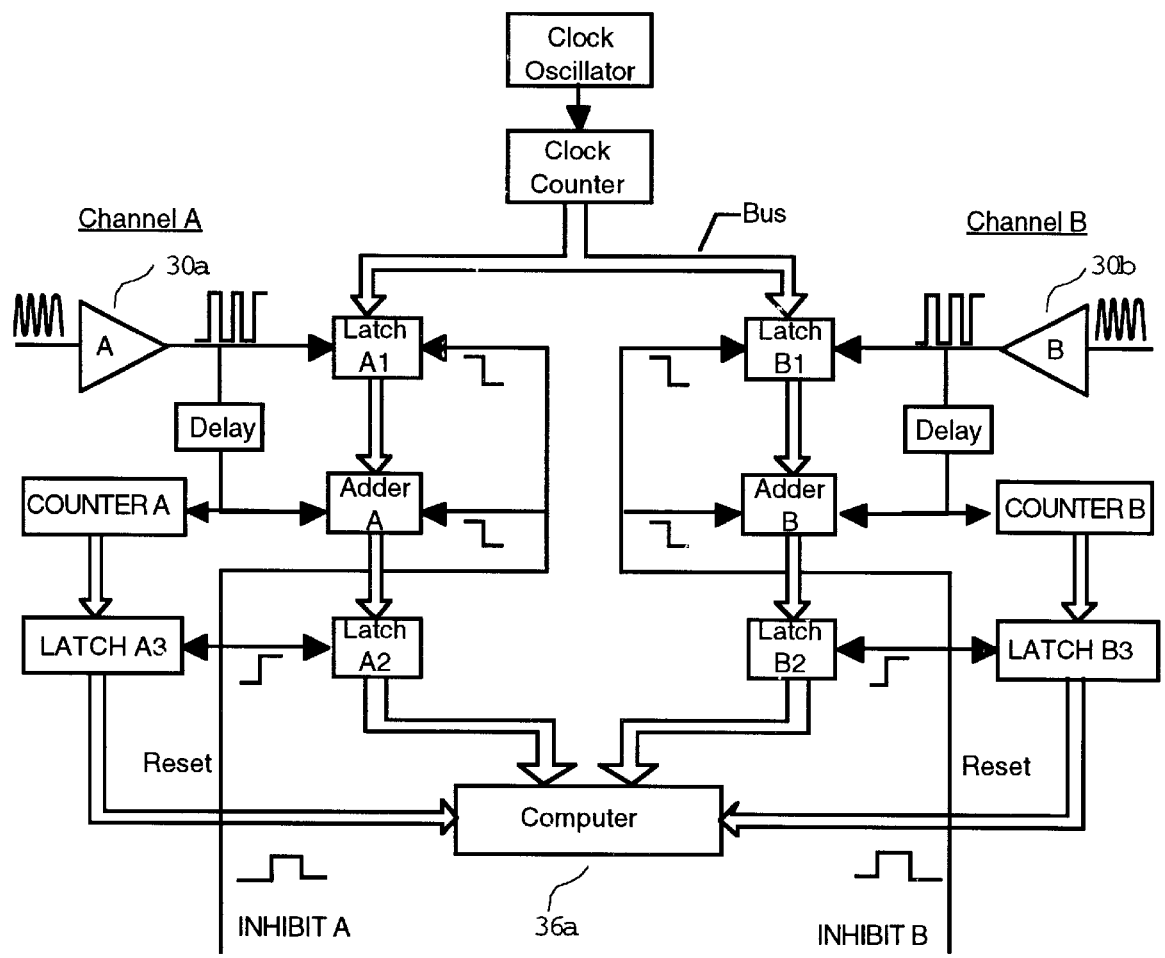
FIG. 6 is a schematic algorithm for measuring the phase between two mechanical oscillators illustrating one manner of accomplishing FIG. 1B.
Figure 7:
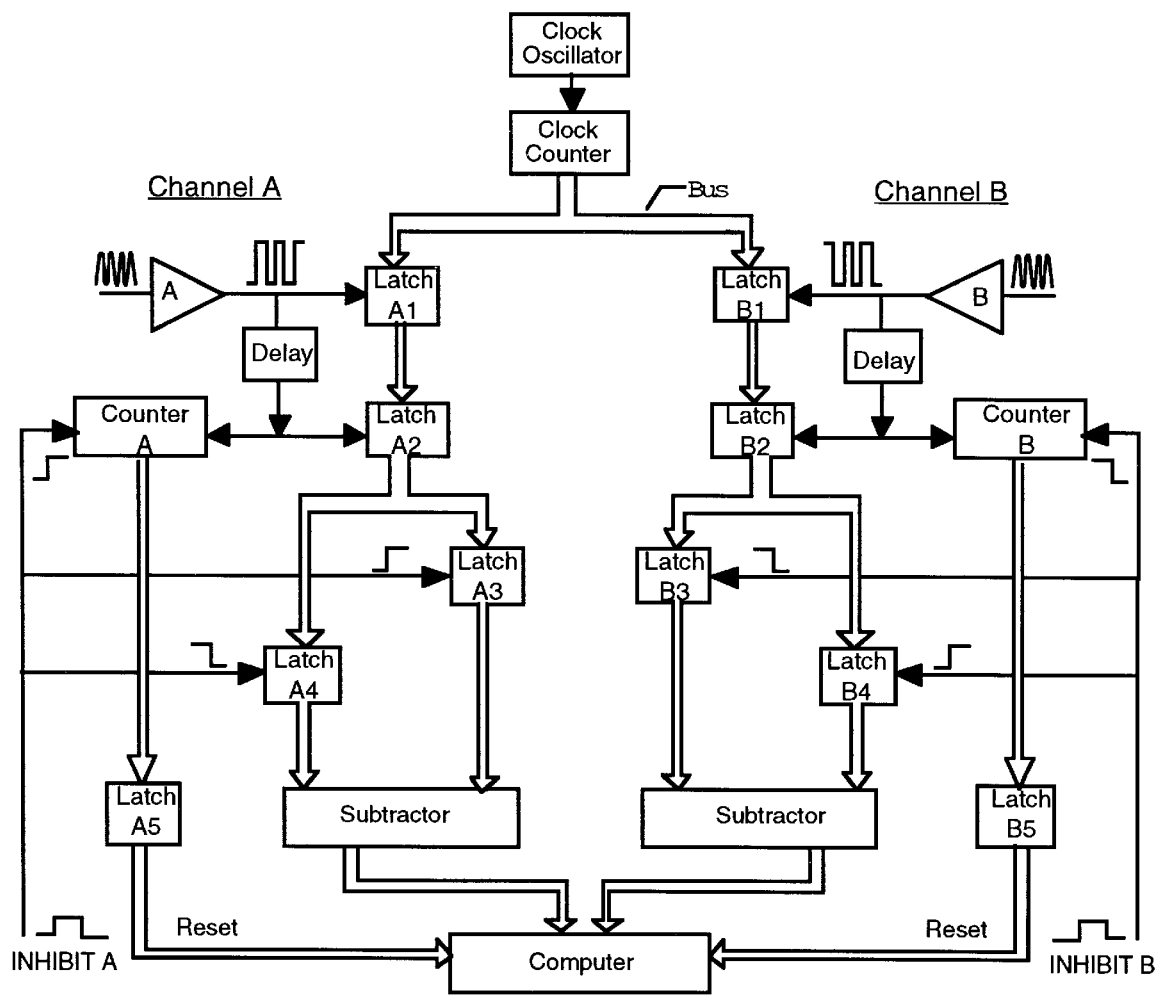
FIG. 7 is a schematic algorithm for controlling the angular amplitudes of mechanical oscillators, illustrating one manner of accomplishing FIG. 1B.

FIGS. 6 and 7 schematically depict means to implement the electronics referred to in FIGS. 1 and 3. Considerations for the phase measurement is that it be insensitive to the mechanical amplitude and oscillation frequency. Considerations for the amplitude measurement is that it be insensitive to mechanical phase and oscillation frequency.

The peaks of the sinusoidal mechanical oscillation whose position in time are to be measured are indicated in FIG. 3, as well as the half cycles. FIG. 6 illustrates the logic for comparing the relative phase of two oscillations based on the concepts of this invention. Consider an inhibit pulse as shown in FIG. 6 added for each motion that defines the beginning and end of each half cycle. This has two purposes: it selects the zero crossings to be used for the determination of the peak times and it excludes noisy unwanted signals that occur at the peaks. The first purpose essentially numbers (identifies) the zero crossings.

The approach to phase measurement is to determine the peak times for each mechanical oscillation peak. The difference between the peak times, of the separate mechanical oscillators is then a measure that can be related to the differential phase.

To obtain a peak time, the zero crossing times which occur at the same grid level on either side of a peak are summed and divided by two. This is repeated for all sets of crossings. For the case described above, the number of crossings per half cycle is about 2000. This is repeated for each peak. Since 2000 crossings are used, the resolution of the peak center is improved by the square root or by a factor of about 45.

The algorithm for taking the data is simplified when it is recognized that the sum and division by two of all the sets of two crossings is equal to the sum of all the zero crossings in one half cycle plus the sum of all the crossings in the next half cycle divided by two. This is the approach followed. The condition that the differential peak time measurement be insensitive to amplitude differences between the mechanical oscillators requires that the peak time for each is further normalized (divided) by the number of crossings for each mechanical oscillation before taking the difference. This condition requires that Channel Counters are used to count the number of zero crossings. The Inhibit Pulse Pattern needs to be controlled so that it is centered about the Peak. The extent of the pulse depends on how many crossings are desired. The centering can be done by feedback from the zero crossing values. The number of crossings in neighboring half cycles need to be the same otherwise the Peak Center position in time will be wrong. In FIG. 6 the solid lines indicate control pulse logic and the double lines the flow of the data. The control pulses move the data along in a coordinated way. Counters in each channel keep track of the number of crossings to ensure that the number in each half cycle is the same.

Half Cycle 1.
Step 1. First Zero Crossing
The first crossing pulse in Channel A (output from comparator 30a) triggers Latch A1 to record zero crossing time.
After a time delay, the same pulse moves the contents of Latch A1 to Adder A. Counter A is increased by 1 to 1.
The first crossing pulse in Channel B (output from comparator 30b) triggers Latch B1 to record zero crossing time.
After a time delay, the same pulse moves the contents of Latch B1 to Adder B. Counter B is increased by 1 to 1. (Adders are a location where the entries are co-added. Counters record the number of crossings.)
Step 2. Second Zero Crossing
The second crossing pulse in Channel A triggers Latch A1 to record zero crossing time. After a time delay, the same pulse moves the contents of Latch A1 to Adder A. Counter A is increased by 1 to 2. Adder A contains sum of first and second crossing times.
The second crossing pulse in Channel B triggers Latch B1 to record zero crossing time. After a time delay, the same pulse moves the contents of Latch B1 to Adder B. Counter B is increased by 1 to 2. Adder B contains sum of first and second crossing times.
Step 3. Repeat Until Peak Pulse
The rising edge of the Inhibit A (Peak) Pulse moves the contents of Adder A into Latch A2 and contents of Counter A into Latch A3. Counter A reads 12.
The rising edge of the Inhibit B (Peak) Pulse moves the contents of Adder B into Latch B2 and contents of Counter B into Latch B3. Counter B reads 12.
The falling edge of the Inhibit A Pulse resets Latch A1, Adder A and Counter A.
The falling edge of the Inhibit B Pulse resets Latch B1, Adder B and Counter B. (The system is ready for the next Half Cycle)
Step 4. Output Half Cycle 1 Data to Computer
Digital contents of Latches A2 and A3 and Counter A are output to the computer 36a to calculate the Peak Time for Channel A.
Digital contents of Latches B2 and B3 and Counter B are output to the computer 36a to calculate the Peak Time for Channel B.

Half Cycle 2
Repeat Steps 1–3 for Half Cycle 2.
Output Half Cycle 2 Data to Computer Computer Processes Half Cycle 1 and Half Cycle 2 data is used to determine the peak time for each of the mechanical oscillators A and B. The Peak Times for mechanical oscillators A and B are used to calculate the phase between them.

Half Cycle 3
Repeat Steps 1–3 for Half Cycle 3.
Output to Computer the Half Cycle 3 Data Computer Processes
Half Cycle 2 and Half Cycle 3 data is used to determine the peak times for the mechanical oscillations A and B.
The Peak times for A and B are used to calculate the phase difference between them.
Half Cycle 4 and so on Continuously
The phase difference data from each set of neighboring half cycles is averaged continuously.

The effect of a change in mechanical oscillation amplitude is to change the number of grid levels hence the number of zero crossings for each half cycle. As long as the symmetry about the peak center is preserved the measurement should always produce the same peak time.

FIG. 7 illustrates one implementation of Time-Referenced Amplitude Control (TRAC), which is the approach invented to control oscillation amplitude by requiring the slope of the mechanical oscillator motion to be constant as measured over a fraction of the oscillation amplitude angle. The slope is maintained constant by requiring that the angle is traversed in the same time interval from cycle to cycle. FIG. 3 illustrated one of the mechanical oscillators treated in the Amplitude Algorithm of FIG. 7. It makes use of several of the same features such as the optical grid and the Inhibit Pulse Pattern. For this illustration, the extent of Inhibit Pulses span one peak of the motion. The region of interest is the fraction of the oscillation angle between the inhibit pulses used in TRAC. The zero crossings within these sections are used to measure the slope. Several options are possible with regards to how the zero crossings are taken and how the calculations are done. The simplest option will be described. All the crossings will be read, however the first crossing after the falling edge of the Inhibit Pulse and the last crossing before the rising edge of the Inhibit Pulse will be used. The difference between their times will be taken as the measure of the slope. The Inhibit Pulse does not coincide with any of the zero crossings. Its rising and falling edges fall in between two zero crossings. The extent of the sampling interval between the inhibit pulses is set by the preference to measure the slope over the linear part of the oscillation curve, about +/−30 degrees about the center of the motion. The Phase Algorithm determines the Peak Times. The Phase Algorithm controls the centering of the Inhibit Pulse Pattern about the Peak Center. The time for the center of the motion is given by adding the Peak Times about it and dividing by two. It is necessary to control the optical grid levels so that they are symmetric about the center of the motion in order for the measurement of the slope to be made at the center of the motion where it is the greatest. Although the amplitude is to be held constant, the algorithm should operate over amplitude changes which might occur due to many reasons. A change in amplitude allows a different number of optical grid levels within the region of interest (same oscillator angle). This would mean that the slope cannot be taken over a set number of crossings because as the amplitude changes, the angle of the motion over which the measurement is made. stays the same but the count number is different. In order to preserve the TRAC concept, the better time to measure is the span in time for the region of interest divided by the number of zero crossings within the region. In order for the amplitude measurement to be insensitive to oscillation frequency changes, the time calculated between inhibit pulses needs to be divided by the period of the motion, otherwise a frequency change directly affects the slope time measured, incorrectly indicating an amplitude change. If the wavelength varies, the spacing between the reference angle levels changes. The algorithm would treat the change like an amplitude change. The amplitude measurement requires a reference much like the phase measurement utilized a stable critical oscillator source. For the laser, the reference is an optical oscillator cavity known as a Fabry Perot etalon. By proper feedback the laser can be locked to it with high precision and the fidelity of the measurement retained.

In the simple scheme being followed, two zero crossings per half cycle are responsible for centering the Inhibit Pulse Pattern, centering the optical grid levels and measuring the slope.

In FIG. 7 the solid lines indicate control pulse logic and the double lines the flow of the data. Counters in each channel keep track of the number of crossings so that the slope time can be properly measured. The algorithm selects the first crossing after the falling edge of the Inhibit Pulse and the last crossing before the rising edge of the same pulse. The time between peaks is half the oscillation period. Only Channel A is described. Channel B operates identically.

HALF CYCLE 1 (Starts After the Falling Edge of the Inhibit Pulse)

Step 1. First zero crossing.
The first crossing in Channel A triggers Latch A1 to record zero crossing time.
After a time delay, the same pulse moves the contents of Latch A1 to Latch A2.
Counter A is increased by 1 to 1. Logic gate says if the count is one, the contents of Latch A2 gets moved to Latch A3.
Step 2. Second Zero Crossing.
The second crossing in Channel A triggers Latch A1 to record crossing time.
After a time delay, the same pulse moves the contents of Latch A1 to Latch A2.
Counter A is increased by 1 to 2. Logic gate does not move the contents of Latch A2 to Latch A3. (Latch A3 stores the first zero crossing time for later use).
Step 3. Third Zero Crossing Time.
The third zero crossing in Channel A triggers Latch A1 to record crossing time.
After a time delay, the same pulse moves the contents of latch A1 to Latch A2.
(Latch A2 contains the last crossing time and the last crossing time was written over). Counter A is advanced by 1 to 3. Logic gate does not move the contents. . . .
Step 4. Continue Until Rising Edge of Inhibit Pulse.
Rising edge of the Inhibit Pulse moves contents of Latch A2 to Latch A4.
(This crossing is the last in the region of interest) Counter A contents are moved to Latch A5. (This is the total number of crossings in the region of interest) After a delay, the contents of Latches A3 and A4 are moved to the Subtractor where the times are differenced.
The contents of the Latch A5 and Subtractor are then moved to the computer for further processing.
Step 5. Continue Until Falling Edge of Inhibit Pulse.
Falling edge of Inhibit Pulse resets Counter A.
(Process ready for taking data in next half cycle)
Computer Processing
Peak times for calculating the oscillation period are available from the phase measurement. With the number of crossings available and the difference between the first and last crossing times also available, the time per crossing divided by the period can be calculated. This result needs to be held constant relative to a reference value in the computer which is used to control the amplitude of oscillation.

Other embodiments will occur to those skilled in the art and are within the following claims.

What is claimed is:

1. A method for resolving one or more of the amplitude of the oscillatory motion of an oscillating member, and the relative phase of the oscillatory motion of oscillating members oscillating at the same frequency, comprising:

providing a clock oscillator signal;

generating, based on the oscillatory motion of each oscillating member, repetitive signals having a feature that occurs with constant increments of the oscillation amplitude;

deriving, based on the clock oscillator and the repetitive signals, the relative times of occurrence of the repetitive signals generated based on the oscillatory motion of each oscillating member; and determining, from the derived relative times, one or more of the amplitude of the oscillatory motion of the oscillating member and the phase of the oscillatory motion of the oscillating members.

2. The method of claim 1, wherein the generating step is accomplished using a Michelson interferometer.

3. The method of claim 2, wherein the repetitive signal comprises fringes from the interference of two optical beams.

4. The method of claim 3, wherein the two optical beams are derived from the same optical source and reflected off of two different portions of an oscillating structure.

5. The method of claim 1, wherein the generating step is accomplished based on capacitive position sensing.

6. The method of claim 5, wherein the capacitive position sensing is accomplished using capacitive fingers on the oscillating member and on a facing stator.

7. The method of claim 1, wherein the generating step is accomplished based on magnetic position sensing.

8. The method of claim 7, wherein the magnetic position sensing is accomplished using magnetic portions on the oscillating member and a magnetic sensor on a facing stator.

9. The method of claim 1, wherein the generating step is accomplished based on optical position sensing.

10. The method of claim 1, wherein the generating step is accomplished using fiducial markings on the oscillating member.

11. The method of claim 1, wherein the deriving step comprises capturing the time from the clock oscillator upon the occurrence of each repetitive signal.

12. The method of claim 3, wherein the generating step comprises AC coupling of the fringe signal to convert the fringe signal pattern to one with a median of zero volts.

13. The method of claim 12, wherein the feature of the repetitive signals is the zero crossings of the AC coupled fringe signal.

14. The method of claim 13, wherein the deriving step comprises saving the clock oscillator output at each zero crossing.

15. The method of claim 14, further comprising inhibiting zero crossings proximate the oscillatory motion amplitude peaks.

16. The method of claim 11, wherein the determining step comprises determining the amplitude based on a derivation of the slope of the amplitude versus time curve around the curve zero crossing from the relative times of the occurrence of the repetitive signals corresponding to equal amplitude levels on both sides of the amplitude versus time curve oscillator zero crossing.

17. The method of claim 16, further comprising controlling the oscillatory motion amplitude by maintaining as constant the relative times of the occurrence of the repetitive signals corresponding to equal amplitude levels on both sides of the amplitude curve zero crossing.

18. The method of claim 11, wherein the determining step comprises determining the phase of the oscillating members based on a derivation of the relative time between successive, repetitive features of the amplitude curves of the oscillating members, and the relative time between successive, repetitive features for each amplitude curve.

19. The method of claim 18, wherein the time of occurrence of the successive, repetitive features is obtained from the relative times of the occurrence of the repetitive signals having the same amplitude level on both sides of the amplitude curve successive, repetitive features.

20. The method of claim 19, wherein the time of occurrence of the successive, repetitive features is obtained by averaging the times of occurrence of a plurality of repetitive signals equally spaced in amplitude on each side of the successive, repetitive features.

21. The method of claim 18, wherein the determining step further comprises averaging the relative times of occurrence of a plurality of the successive, repetitive features and the period over a plurality of cycles of the amplitude curves.

22. The method of claim 20, further comprising controlling the phase of the oscillatory motion by controlling the average relative times between the successive, repetitive features.

23. The method of claim 18, wherein the successive, repetitive features are the peaks of the amplitude curve.

24. The method of claim 19, wherein the successive, repetitive features are the peaks of the amplitude curve.

25. The method of claim 21, wherein the successive, repetitive features are the peaks of the amplitude curve.

26. The method of claim 4, further comprising locking the optical source to a Fabry Perot optical oscillator cavity.

27. A method for resolving one or more of the amplitude of the oscillatory motion of an oscillating member, and the relative phase of the oscillatory motion of oscillating members oscillating at the same frequency, comprising:

providing a clock oscillator signal;

reflecting optical beams off of different portions of an oscillator and generating fringes from the interference of the reflected beams, and AC coupling the fringe signal to convert the fringe signal pattern to one with a median of zero volts and comprising a plurality of signal zero crossings;

saving the c lock oscillator output at each zero crossing of the AC coupled fringe signal; and determining, from the saved clock outputs, one or more of the amplitude of the oscillatory motion of the oscillating member and the phase of the oscillatory motion of the oscillating members.

28. A system for determining the amplitude and phase of an oscillating member which oscillates relative to a fixed structure, comprising:

means for determining the times at which the oscillating member passes through a fixed reference angle on each side of the oscillation peak, comprising:

indicating means on the oscillating member;

detector means, responsive to the indicator means, and coupled to the fixed structure, the detector means determining the position of the indicating means relative to the fixed structure, over time, as the oscillating member oscillates; and means, responsive to the detector means, for creating a pulse each time the member passes through the fixed reference angle;

a stable clock reference; and means for determining, from the pulses and the clock reference, the amplitude and phase of the oscillating member.

* * * * *